United States Patent
Purushothama

(10) Patent No.: US 11,772,537 B2
(45) Date of Patent: Oct. 3, 2023

(54) RETRACTABLE HANDRAIL ARRANGEMENT

(71) Applicant: Volvo Truck Corporation, Gothenburg (SE)

(72) Inventor: Kaveesha Purushothama, Bengaluru Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 129 days.

(21) Appl. No.: 17/433,340

(22) PCT Filed: Dec. 16, 2019

(86) PCT No.: PCT/EP2019/085332
§ 371 (c)(1),
(2) Date: Aug. 24, 2021

(87) PCT Pub. No.: WO2020/182331
PCT Pub. Date: Sep. 17, 2020

(65) Prior Publication Data
US 2022/0048424 A1    Feb. 17, 2022

(30) Foreign Application Priority Data

Mar. 12, 2019   (IN) ............................ 2019441009460

(51) Int. Cl.
*B60N 3/02*     (2006.01)
(52) U.S. Cl.
CPC .................................. *B60N 3/023* (2013.01)
(58) Field of Classification Search
CPC ................................ B60N 3/023; B60N 3/026
(Continued)

(56) References Cited

U.S. PATENT DOCUMENTS

| 3,997,183 A | 12/1976 | Russey |
| 4,029,352 A | 6/1977 | Evans |

(Continued)

FOREIGN PATENT DOCUMENTS

| CN | 105438037 A | 3/2016 |
| DE | 202008004706 U1 | 6/2008 |

(Continued)

OTHER PUBLICATIONS

International Search Report and Written Opinion for International Patent Application No. PCT/EP2019/085332, dated Apr. 3, 2020, 14 pages.

(Continued)

*Primary Examiner* — Jason S Morrow
(74) *Attorney, Agent, or Firm* — Withrow & Terranova, PLLC

(57) ABSTRACT

A retractable handrail arrangement arranged for assisting a vehicle operator during entry and/or exit of a vehicle, the retractable handrail arrangement comprising a grab handle comprising an elongated upper grab handle portion and a lower grab handle portion, the lower grab handle portion being movable along at least a portion of the elongated upper grab handle portion; a reciprocating connecting element comprising a first portion fixedly connected to the elongated upper grab handle portion, and a second portion comprising an upper hinge portion, the upper hinge portion being rotatably connectable to a stationary portion of the vehicle; and a first rotatable connecting element comprising a grab handle connecting portion rotatably connected to the lower grab handle portion, and an inner connecting portion comprising a lower hinge portion, the lower hinge portion being rotatably connectable to a stationary portion of the vehicle.

15 Claims, 4 Drawing Sheets

(58) Field of Classification Search
USPC ........................................................ 296/1.02
See application file for complete search history.

(56) References Cited

U.S. PATENT DOCUMENTS

| | | | |
|---|---|---|---|
| 5,024,420 A * | 6/1991 | Downing | E04B 1/34336 52/150 |
| 5,076,547 A | 12/1991 | Osterholm | |
| 6,425,572 B1 | 7/2002 | Lehr | |
| 6,974,134 B1 | 12/2005 | Macri et al. | |
| 8,240,710 B1 | 8/2012 | Rawls | |
| 8,794,660 B1 * | 8/2014 | Stover | H05K 999/99 280/727 |
| 11,046,226 B1 * | 6/2021 | Younce | B60N 3/023 |
| 11,198,382 B2 * | 12/2021 | Song | B60N 3/026 |
| 2013/0020821 A1 * | 1/2013 | Abe | B60N 3/02 296/1.02 |
| 2014/0158465 A1 | 6/2014 | Salzman | |
| 2019/0193617 A1 | 6/2019 | Specht et al. | |
| 2021/0162905 A1 * | 6/2021 | Song | B60N 3/023 |
| 2022/0048424 A1 * | 2/2022 | Purushothama | B60R 3/00 |

FOREIGN PATENT DOCUMENTS

| | | |
|---|---|---|
| GB | 1349760 A | 4/1974 |
| GB | 2477429 A | 8/2011 |
| JP | 7117051 B1 * | 8/2022 |

OTHER PUBLICATIONS

First Office Action for Chinese Patent Application No. 201980093226.1, dated Nov. 22, 2022, 16 pages.

Examination Report for Indian Patent Application No. 202147034800, dated Nov. 2, 2022, 6 pages.

* cited by examiner

RETRACTABLE HANDRAIL ARRANGEMENT

This application is a 35 USC 371 national phase filing of International Application No. PCT/EP2019/085332, filed Dec. 16, 2019, which claims the benefit of Indian Patent Application No. 201941009460, filed Mar. 12, 2019, the disclosures of which are incorporated herein by reference in their entireties.

TECHNICAL FIELD

The present disclosure relates to a retractable handrail arrangement. The retractable handrail arrangement is particularly suitable for use in a vehicle. The disclosure therefore also relates to a vehicle comprising such a retractable handrail arrangement. Although the retractable handrail arrangement will mainly be described in relation to a truck, it may also be applicable for other types of vehicles in need of assisting a driver to enter the cabin compartment. Such vehicle may e.g. be a working machine, etc.

BACKGROUND

When a vehicle operator enters the vehicle cabin, the use of a grab handle is preferable for assisting the operator to efficiently reach the rather elevated cabin compartment. The grab handle is also often utilized during exit from the vehicle cabin. In particular, during entry, the operator reaches for the grab handle and, together with the use of a foot support, raises himself to enter the vehicle cabin. For safe and comfortable entry, the vehicle operator should preferably have a three point contact support before raising himself towards the vehicle cabin. The three point contact implies that the operator has one foot on the ground surface, one foot on the foot support, and at least one hand on the grab handle.

A conventional solution is to use a first grab handle connected to the so-called A-pillar of the vehicle, and a second grab handle connected to the vehicle door. The latter grab handle is also preferably used for closing the vehicle door once seated. By using such stationary grab handles, it can be rather difficult to reach one of the grab handles while at the same time keeping balance having one foot on the ground and the other foot on the foot support. Furthermore, the use of a first grab handle connected to the A-pillar may restrict the operator during driving as it may be in the way and not providing sufficient driver knee clearance when the door is closed. A further problem is that the second grab handle connected to the vehicle door may be positioned too far away from the operator to reach when seated and closing the door.

There is thus a desire to provide a grab handle which enables for simplified entry to, and exit from the vehicle cabin. The grab handle should also preferably be rather easy to reach as well as providing for sufficient knee clearance.

SUMMARY

It is an object of the present disclosure to describe a retractable handrail arrangement which at least partially overcomes the above described deficiencies. This is achieved by a retractable handrail arrangement according to claim 1.

According to a first aspect, there is provided a retractable handrail arrangement arranged for assisting a vehicle operator during entry and/or exit of a vehicle, the retractable handrail arrangement comprising a grab handle comprising an elongated upper grab handle portion and a lower grab handle portion, the lower grab handle portion being movable along at least a portion of the elongated upper grab handle portion; a reciprocating connecting element comprising a first portion fixedly connected to the elongated upper grab handle portion, and a second portion comprising an upper hinge portion, the upper hinge portion being rotatably connectable to a stationary portion of the vehicle; and a first rotatable connecting element comprising a grab handle connecting portion rotatably connected to the lower grab handle portion, and an inner connecting portion comprising a lower hinge portion, the lower hinge portion being rotatably connectable to a stationary portion of the vehicle.

The wording "first rotatable connecting element" should be construed as an element which rotates relative its connecting portions, i.e. relative the lower grab handle portion and relative the stationary portion of the vehicle, when connected thereto. Furthermore, the lower grab handle portion may movable along the elongated upper grab handle portion in different manners, such as e.g. by being telescopically connected to the elongated upper grab handle portion, or slidably connected to the elongated upper grab handle portion.

An advantage is that the accessibility of the handrail arrangement will be improved. In particular, when the retractable handrail arrangement is connected to the vehicle door, the lower grab handle portion will slide downwards when opening the door, i.e. during rotation of the upper hinge portion of the reciprocating connecting element.

Hereby, the operator can easily reach the lower grab handle portion for accessing the vehicle cabin. By using a retractable handrail arrangement will also improve the driver knee clearance as it can be arranged close to the vehicle door when the vehicle door is closed. In other words, when opening the vehicle door, the vehicle operator can easily access the actuated lower grab handle portion and enter the vehicle cabin comfortably. After entering the vehicle cabin the operator can use the same handrail arrangement to close the door without reachability issues. As the retractable handrail arrangement will enable for more knee clearance, it will also improve the safety for the operator during driving.

According to an example embodiment, the reciprocating connecting element may comprise an outer connecting element comprising the first portion, and an inner connecting element comprising the second portion, wherein one of the inner and outer connecting elements are arranged to telescope relative the other one of the inner and outer connecting elements.

A telescopic interconnection is suitable for enabling the reciprocating motion of the reciprocating connecting element.

According to an example embodiment, the upper hinge portion may be arranged to rotate around an upper geometric axis, wherein a direction of the upper geometric axis is substantially parallel with the extension of the elongated upper grab handle portion.

Hereby, the upper geometric axis will be moved in a substantially horizontal plane, and can thus be suitably connected to a vehicle door to follow the motion of the door when opening and closing the door.

According to an example embodiment, the lower hinge portion may be arranged to rotate around a lower geometric axis, wherein a direction of the lower geometric axis is non-parallel to the direction of the upper geometric axis.

Hereby, the lower hinge portion can enable for a rotation such that the lower grab handle portion will move downwardly when opening the vehicle door.

According to an example embodiment, the direction of the lower geometric axis may be substantially perpendicular to the direction of the upper geometric axis.

According to an example embodiment, the elongated upper grab handle portion and the lower grab handle portion may form a telescoping interconnection.

Other alternatives are also conceivable, such as a connecting portion which is arranged to slide along the elongated upper grab handle portion. In fact, any arrangement that will move the lower grab handle portion relative the elongated upper grab handle portion can be used.

According to an example embodiment, the grab handle connecting portion may be arranged to rotate around a geometric axis being perpendicular to the direction of the elongated upper grab handle portion.

According to an example embodiment, the lower grab handle portion may be an elongated lower grab handle portion having an extension in the same direction as the elongated upper grab handle portion.

Using an elongated lower grab handle portion is advantageous as it will enable for even further reachability for an operator when entering the vehicle cabin.

According to an example embodiment, the first rotatable connecting element may be connected to an upper portion of the elongated lower grab handle portion, wherein the retractable handrail arrangement further comprises a second rotatable connecting element comprising a lower grab handle connecting portion rotatably connecting the second rotatable connecting element to a lower portion of the elongated lower grab handle portion.

Hereby, the retractable handrail arrangement will be more robust using further connection points.

According to an example embodiment, the second rotatable connecting element may comprise a second inner connecting portion comprising a second lower hinge portion, the second lower hinge portion being rotatably connectable to a stationary portion of the vehicle.

According to an example embodiment, the lower grab handle connecting portion may be arranged to rotate around a geometric axis being perpendicular to the direction of the elongated upper grab handle portion.

Preferably, the geometric axis around which the lower grab handle connecting portion rotates is parallel with the geometric axis around which the grab handle connecting portion rotates.

According to a second aspect, there is provided a vehicle comprising a vehicle door rotatably connected to a stationary portion of the vehicle, the vehicle further comprising a retractable handrail arrangement according to any one of the above described embodiments of the first aspect, wherein the upper hinge portion and the lower hinge portion are connected to the stationary portion of the vehicle.

According to an example embodiment, the elongated upper grab handle portion may be connected to the vehicle door.

According to an example embodiment, the reciprocating connecting element may be arranged in an extended state when the door is opened from the vehicle, and arranged in a retracted state when the door is closed.

According to an example embodiment, the lower grab handle portion may be moved in a vertical direction away from the reciprocating connecting element when opening the door.

Hereby, the operator will be able to sufficiently reach the lower grab handle portion when the vehicle door is opened.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
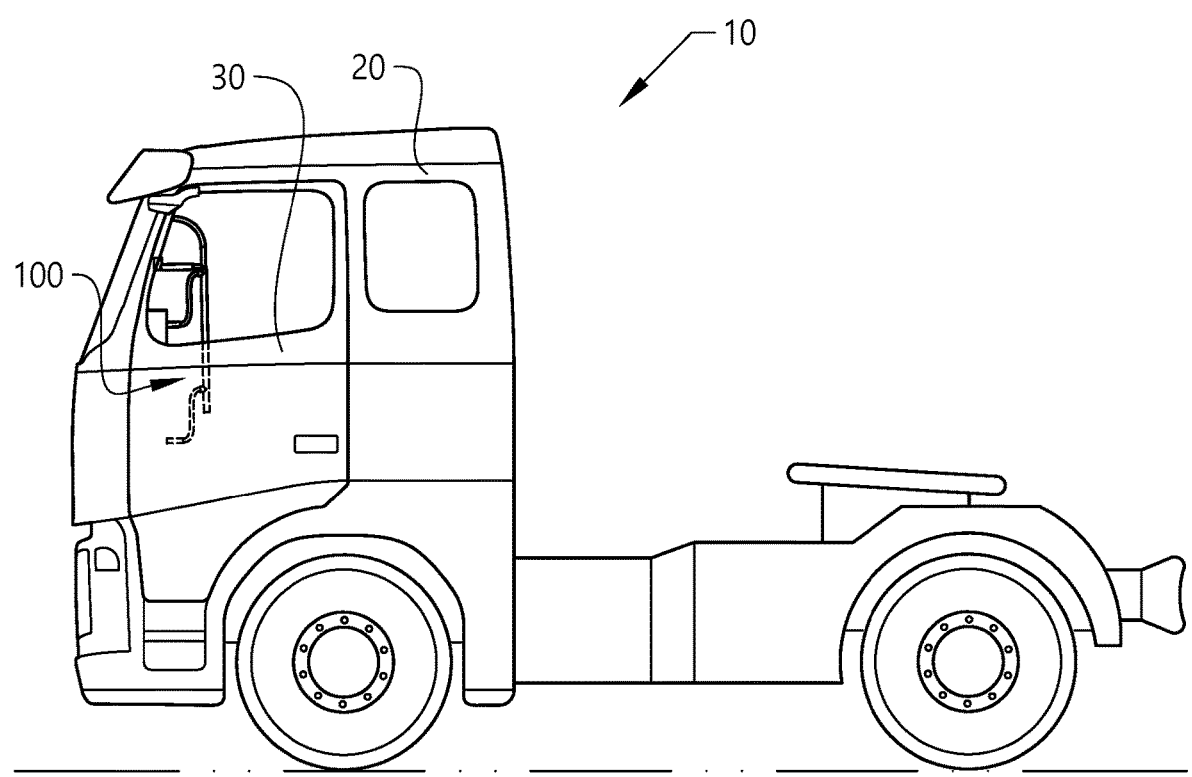
FIG. 1 is a lateral side view illustrating an example embodiment of a vehicle in the form of a truck, wherein the vehicle comprises a vehicle cabin.

The present disclosure will now be described more fully hereinafter with reference to the accompanying drawings, in which an exemplary embodiment is shown. The disclosure may, however, be embodied in many different forms and should not be construed as limited to the embodiment set forth herein; rather, the embodiment is provided for thoroughness and completeness. Like reference character refer to like elements throughout the description.

Figure 2A:
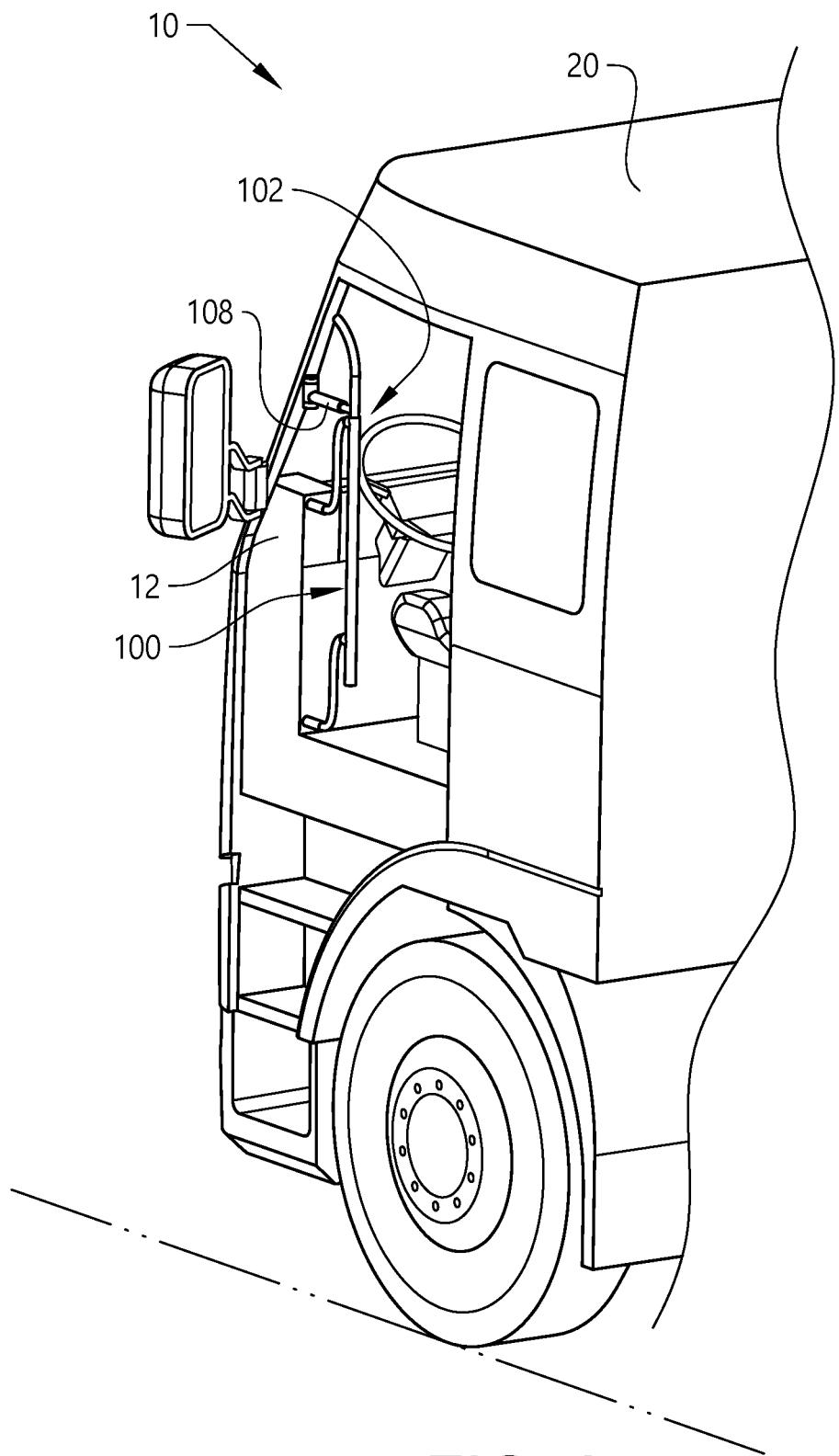
FIG. 2a is a perspective view of the vehicle cabin where an example embodiment of a retractable handrail arrangement is depicted when the vehicle door is closed.
Figure 2B:
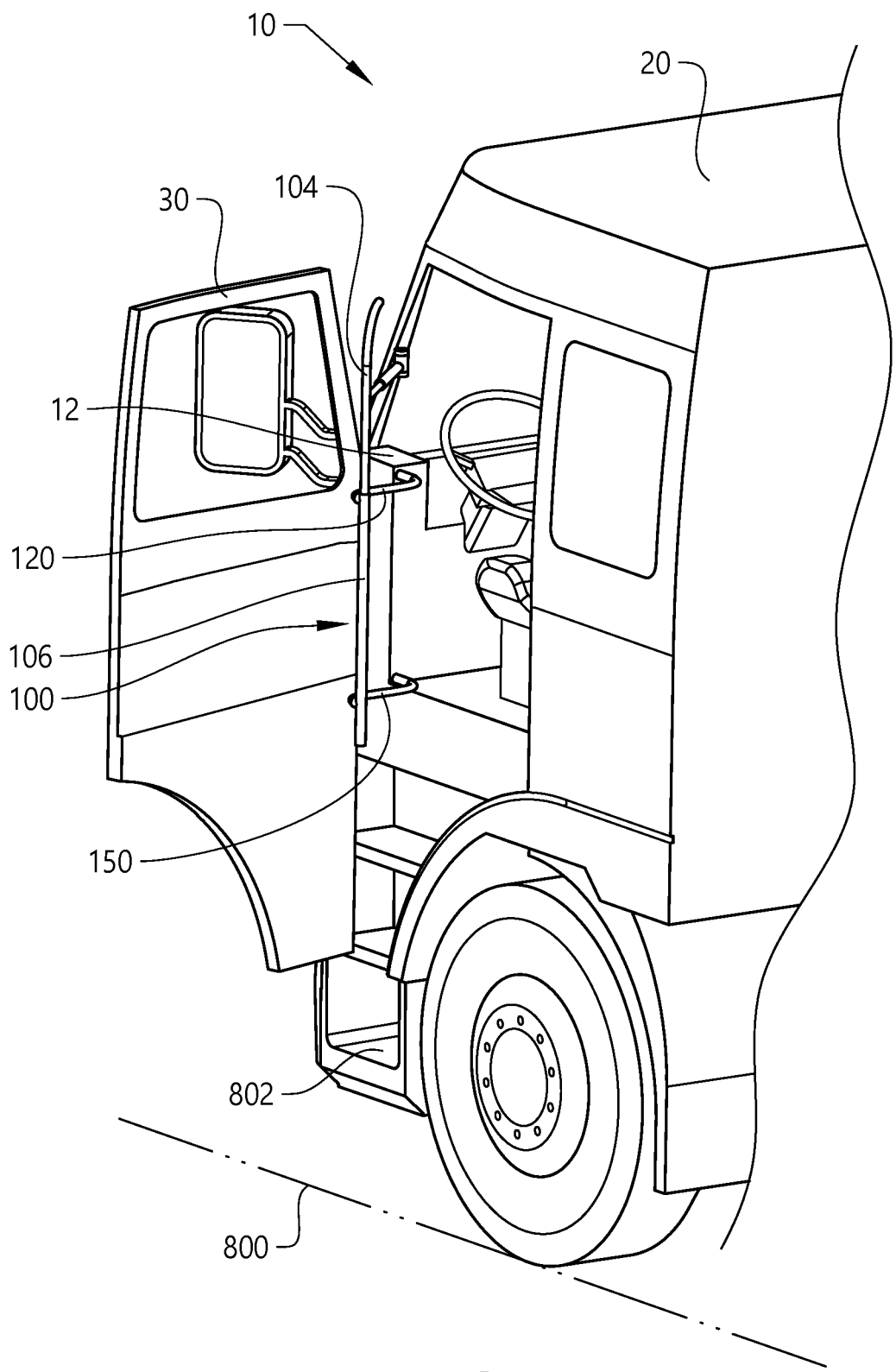
FIG. 2b is a perspective view of the vehicle cabin where the example embodiment of the retractable handrail arrangement is depicted when the vehicle door is open.
Figure 3:
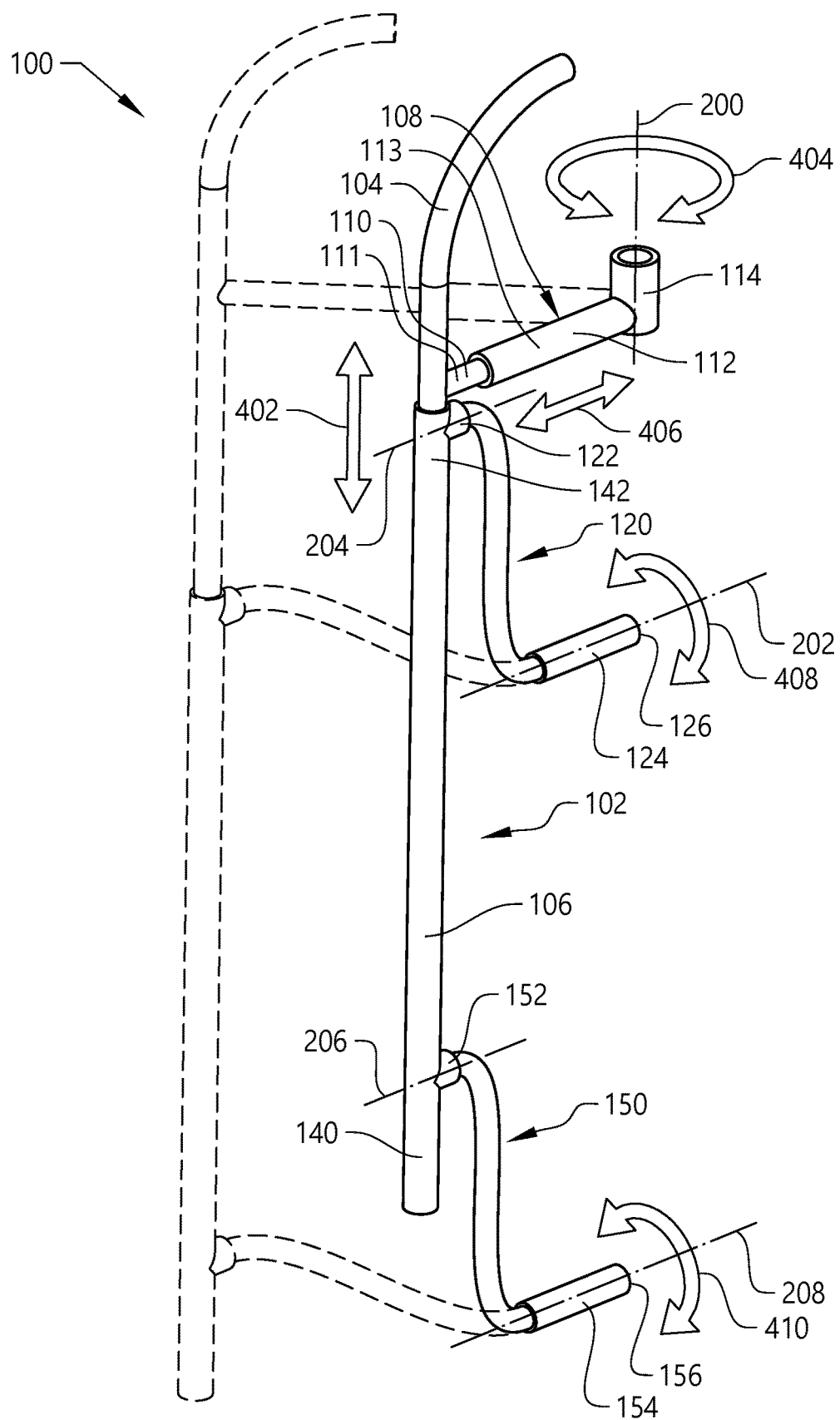
FIG. 3 is a perspective view of the retractable handrail arrangement according to an example embodiment.

With particular reference to FIG. 1, there is provided a vehicle 10 in the form of a truck. The vehicle 10 comprises a vehicle cabin 20 and a vehicle door 30 through which an operator of the vehicle 10 can enter or exit the vehicle cabin 20. As depicted in FIG. 1, the vehicle 10 further comprises a retractable handrail arrangement 100 connected to the vehicle door 30 and to at least one stationary portion 12 (see e.g. FIGS. 2a-2b) of the vehicle 10. The retractable handrail arrangement 100, which is described in further detail below with reference to FIGS. 2a-3, is arranged to assist the vehicle operator to enter and exit the vehicle cabin 20. The operator can also use the retractable handrail arrangement 100 also to close the vehicle door 30 once seated in the vehicle cabin 20.

In order to describe the retractable handrail arrangement in further detail, reference is made to FIGS. 2a-2b which are perspective views of the vehicle cabin and the retractable handrail arrangement according to an example embodiment. In particular, FIG. 2a illustrates the retractable handrail arrangement 100 in its position when the vehicle door is closed. The vehicle door is omitted from FIG. 2a for simplicity of understanding, while FIG. 2b illustrates the retractable handrail arrangement 100 in its position when the vehicle door 30 is open. As can be seen in FIGS. 2a-2b, the retractable handrail arrangement 100 is actuated by the movement of the vehicle door 30. In particular, when the vehicle door 30 is closed, the retractable handrail arrangement 100 is arranged within the vehicle cabin structure. As can be observed in FIG. 2a, a grab handle 102 of the retractable handrail arrangement 100 is arranged substantially parallel with the vehicle door. The retractable handrail arrangement also comprises a reciprocating connecting element 108, which reciprocating connecting element 108 is connecting the retractable handrail arrangement 100 to a stationary portion 12 of the vehicle. The reciprocating connecting element 108 extends substantially in the driving direction of the vehicle when the vehicle door is closed.

As described, the retractable handrail arrangement 100 is preferably actuated by the movement of the vehicle door 30. A portion of the retractable handrail arrangement 100 is therefore preferably connected to the vehicle door 30. Preferably, at least one of an upper grab handle portion 104, a first rotatable connecting element 120 and a second rotatable connecting element 150 of the retractable handrail arrangement 100 is connected to the vehicle door 30 such as to follow the motion of the vehicle door 30 when being opened and closed. The retractable handrail arrangement 100 is preferably connected close to the inner surface of the vehicle door 30 such as not to impact driver knee clearance when the vehicle door 30 is closed. When the vehicle door 30 is opened, a lower grab handle portion 106 of the retractable handrail arrangement 100 will move vertically downwards. Thus, during entry of the vehicle cabin 20, the operator may here use a so-called three point contact for improved balance. The operator will thus be able to have one foot on the ground 800, one foot on the foot support 802, as well as one hand on a lower grab handle portion 106 of the retractable handrail arrangement 100.

In order to describe the retractable handrail arrangement 100, and its functionality, in further detail, reference is made to FIG. 3 which is a perspective view of the retractable handrail arrangement 100 according to an example embodiment. In particular, FIG. 3 illustrates the retractable handrail arrangement 100 in solid lines when vehicle door 30 is closed and in dashed lines when the vehicle door 30 is open. The vehicle door 30 is omitted from FIG. 3 for simplicity of illustration. FIG. 3 further illustrates the movement of various components of the retractable handrail arrangement 100 during opening/closing of the vehicle door 30.

The retractable handrail arrangement 100 comprises a grab handle 102, which grab handle 102 comprises an elongated upper grab handle portion 104 and a lower grab handle portion 106. According to the example embodiment depicted in the figures, the lower grab handle portion 106 is also elongated and extends in the same direction as a major portion of the elongated upper grab handle portion 104. The lower grab handle portion 106 is movable relative the elongated upper grab handle portion 104 as depicted with the vertical arrow 402. As also depicted in FIG. 3, the elongated upper grab handle portion 104 and the lower grab handle portion 106 form a telescoping interconnection. The elongated upper grab handle portion 104 is here movable within the lower grab handle portion 106. The upper 104 and lower 106 grab handle portions are here formed by a respective pipe where the pipe diameter of the lower grab handle portion 106 is larger than the pipe diameter of the upper grab handle portion 104.

Furthermore, the retractable handrail arrangement 100 comprises a reciprocating connecting element 108 connecting the elongated upper grab handle portion 104 to the stationary portion 12 of the vehicle 10. In particular, reciprocating connecting element 108 comprises a first portion 110 which is fixedly connected to the elongated upper grab handle portion 104, and a second portion 112 which comprises an upper hinge portion 114. The upper hinge portion 114 is in turn rotatably connected to the stationary portion 12 of the vehicle 10. As can be seen in FIG. 3, the upper hinge portion 114 is arranged to rotate around an upper geometric axis 200, which rotation is depicted with the arrow 404. According to the depicted embodiment in FIG. 3, the upper geometric axis 200 is more or less parallel with the extension of the elongated upper grab handle portion 104.

As is also illustrated in FIG. 3, the reciprocating connecting element 108 comprises an inner 113 and an outer 111 connecting element. The reciprocating connecting element 108 is here retractable in that the outer connecting element 111 is movable relative the inner connecting element 113. In detail, the inner 113 and outer 111 connecting elements are arranged as a telescopic interconnection where the inner connecting element 113 is movable along the direction of arrow 406.

Moreover, the retractable handrail arrangement 100 further comprises a first rotatable connecting element 120 which comprises a grab handle connecting portion 122. The grab handle connecting portion 122 is rotatably connected to an upper end 142 of the lower grab handle portion 106. The grab handle connecting portion 122 is rotatable around a geometric axis 204. The geometric axis 204 is preferably perpendicular to the direction of the elongated upper grab handle portion 104. Further, the first rotatable connecting element 120 also comprises an inner connecting portion 124. The inner connecting portion 124 comprises a lower hinge portion 126 which is rotatably connected to the stationary portion 12 of the vehicle 10. The lower hinge portion 126 is arranged to rotate around a lower geometric axis 202. The lower hinge portion 126 is here rotatable in the direction of arrow 408.

The retractable handrail arrangement 100 also comprises a second rotatable connecting element 150 connected between a lower portion 140 of the lower grab handle portion 106 and the stationary portion 12 of the vehicle 10. In particular, the second rotatable connecting element 150 comprises a lower grab handle connecting portion 152 which rotatably connects the second rotatable connecting element 150 to the lower portion 140 of the lower grab handle portion 106. The lower grab handle connecting portion 152 is rotatable around a geometric axis 206. The geometric axis 206 is preferably perpendicular to the direction of the elongated upper grab handle portion 104.

The second rotatable connecting element 150 further comprises a second inner connecting portion 154 comprising a second lower hinge portion 156. The second lower hinge portion 156 is rotatably connectable to a stationary portion of the vehicle.

The second lower hinge portion 156 is arranged to rotate around a second lower geometric axis 208. The second lower hinge portion 156 is here rotatable in the direction of arrow 410.

The following will now describe the movement of the above described components during actuation of the vehicle door 30, i.e. when opening and closing the vehicle door 30. For simplicity of description, focus will be given on the description of opening the door from its closed position to its open position.

When the vehicle door 30 is closed, the reciprocating connecting element 108 is arranged in its retracted position and the lower grab handle portion 106 is arranged in its upper most position along the elongated upper grab handle portion 104. Hereby, the first 120 and second 150 rotatable connecting elements are positioned pointing upwards.

When the vehicle door 30 is opened, the elongated upper grab handle portion 104 will follow the motion of the vehicle door 30. The upper hinge portion 114 will rotate around the upper geometric axis 200 for rotation as illustrated by arrow 404. As the elongated upper grab handle portion 104 will follow the motion of the vehicle door 30, the reciprocating connecting element 108 will expand and arranged in an extended state such that the elongated upper grab handle portion 104 is moved laterally away from the upper hinge portion 114. The movement of the vehicle door 30 will also, due to the rotatable connection of the grab handle connecting portion 122 to the lower grab handle portion 106 and the connection of the lower hinge portion 126 to the stationary portion 12 of the vehicle, move the lower grab handle portion 106 downwards in the direction indicated by arrow 402. The second rotatable connecting element 150 will also in such a way that the lower grab handle connecting portion 152 will move downwardly. Hereby, the lower grab handle portion 106 is moved laterally downwards when the vehicle door 30 is open which will improve the reachability for the operator when aiming to use the retractable handrail arrangement 100 as a support for entering the vehicle.

When thereafter closing the vehicle door 30, the above described components of the retractable handrail arrangement 100 will move in the opposite direction compared to the above description.

It is to be understood that the present disclosure is not limited to the embodiments described above and illustrated in the drawings; rather, the skilled person will recognize that many changes and modifications may be made within the scope of the appended claims.

The invention claimed is:

1. A retractable handrail arrangement configured to assist a vehicle operator during entry and/or exit of a vehicle, the retractable handrail arrangement comprising:
    a grab handle comprising an elongated upper grab handle portion and a lower grab handle portion, the lower grab handle portion being movable along at least a portion of the elongated upper grab handle portion;
    a reciprocating connecting element comprising a first portion fixedly connected to the elongated upper grab handle portion, and a second portion comprising an upper hinge portion, the upper hinge portion being rotatably connectable to a stationary portion of the vehicle; and
    a first rotatable connecting element comprising a grab handle connecting portion rotatably connected to the lower grab handle portion, and an inner connecting portion comprising a lower hinge portion, the lower hinge portion being rotatably connectable to a stationary portion of the vehicle.

2. The retractable handrail arrangement of claim 1, wherein the reciprocating connecting element comprising an outer connecting element comprising the first portion, and an inner connecting element comprising the second portion, wherein one of the inner and outer connecting elements are configured to telescope relative the other one of the inner and outer connecting elements.

3. The retractable handrail arrangement of claim 1, wherein the upper hinge portion is configured to rotate around an upper geometric axis, wherein a direction of the upper geometric axis is substantially parallel with extension of the elongated upper grab handle portion.

4. The retractable handrail arrangement of claim 3, wherein the lower hinge portion is configured to rotate around a lower geometric axis, wherein a direction of the lower geometric axis is non-parallel to the direction of the upper geometric axis.

5. The retractable handrail arrangement of claim 4, wherein the direction of the lower geometric axis is substantially perpendicular to the direction of the upper geometric axis.

6. The retractable handrail arrangement of claim 1, wherein the elongated upper grab handle portion and the lower grab handle portion form a telescoping interconnection.

7. The retractable handrail arrangement of claim 1, wherein the grab handle connecting portion is configured to rotate around a geometric axis perpendicular to an extension of the elongated upper grab handle portion.

8. The retractable handrail arrangement of claim 1, wherein the lower grab handle portion is an elongated lower grab handle portion having an extension parallel to the elongated upper grab handle portion.

9. The retractable handrail arrangement of claim 8, wherein the first rotatable connecting element is connected to an upper portion of the elongated lower grab handle portion, wherein the retractable handrail arrangement further comprises a second rotatable connecting element comprising a lower grab handle connecting portion rotatably connecting the second rotatable connecting element to a lower portion of the elongated lower grab handle portion.

10. The retractable grab handle arrangement of claim 9, wherein the second rotatable connecting element comprises a second inner connecting portion comprising a second lower hinge portion, the second lower hinge portion being rotatably connectable to a stationary portion of the vehicle.

11. The retractable grab handle arrangement of claim 9, wherein the lower grab handle connecting portion is configured to rotate around a geometric axis perpendicular to an extension of the elongated upper grab handle portion.

12. A vehicle comprising a vehicle door rotatably connected to a stationary portion of the vehicle, the vehicle further comprising a retractable handrail arrangement, configured to assist a vehicle operator during entry and/or exit of a vehicle, the retractable handrail arrangement comprising:
    a grab handle comprising an elongated upper grab handle portion and a lower grab handle portion, the lower grab handle portion being movable along at least a portion of the elongated upper grab handle portion;
    a reciprocating connecting element comprising a first portion fixedly connected to the elongated upper grab handle portion, and a second portion comprising an upper hinge portion, the upper hinge portion being rotatably connectable to a stationary portion of the vehicle; and
    a first rotatable connecting element comprising a grab handle connecting portion rotatably connected to the lower grab handle portion, and an inner connecting portion comprising a lower hinge portion, the lower hinge portion being rotatably connectable to a stationary portion of the vehicle, wherein the upper hinge portion and the lower hinge portion are connected to the stationary portion of the vehicle.

13. The vehicle of claim 12, wherein the elongated upper grab handle portion is connected to the vehicle door.

14. The vehicle of claim 13, wherein the reciprocating connecting element is in an extended state when the door is opened from the vehicle, and in a retracted state when the door is closed.

15. The vehicle of claim 13, wherein the lower grab handle portion is moved in a vertical direction away from the reciprocating connecting element when opening the door.

* * * * *